United States Patent [19]

Schlienkamp

[11] Patent Number: 4,519,962

[45] Date of Patent: May 28, 1985

[54] METHOD AND SYSTEM FOR SEALING THE EDGES OF INSULATING-GLASS PANELS

[75] Inventor: Hubert Schlienkamp, Witten, Fed. Rep. of Germany

[73] Assignee: Szabo Maschinenbau GmbH & Co. KG, Radevormwald, Fed. Rep. of Germany

[21] Appl. No.: 533,643

[22] Filed: Sep. 16, 1983

[30] Foreign Application Priority Data

Sep. 16, 1982 [DE] Fed. Rep. of Germany ....... 3234320

[51] Int. Cl.[3] ...................... B29C 23/00; B29C 27/00; B29D 31/00

[52] U.S. Cl. .................................. 264/40.7; 118/323; 118/408; 118/410; 156/107; 156/109; 156/356; 156/363; 264/261; 264/263; 264/267; 425/114; 425/145; 425/150

[58] Field of Search ........................ 264/261, 263, 267; 425/110, 113, 114, 123, 502, 504, 516, 150, 376 R, 145, 377; 156/109, 292, 500, 556, 559, 574, 575, 578, 356, 107, 357, 358, 350, 363; 118/410, 408, 323

[56] References Cited

U.S. PATENT DOCUMENTS

| | | | |
|---|---|---|---|
| 3,075,868 | 1/1963 | Long | 156/244.23 |
| 3,227,786 | 1/1966 | Cohen | 264/174 |
| 3,339,234 | 9/1967 | Utz | 156/244.14 |
| 3,575,762 | 4/1971 | Goehring et al. | 156/244.23 |
| 3,972,970 | 8/1976 | Taylor | 264/174 |
| 4,085,238 | 4/1978 | Chenel et al. | 156/109 |
| 4,088,522 | 5/1978 | Mercier et al. | 156/109 |
| 4,120,999 | 10/1978 | Chenel et al. | 156/109 |
| 4,234,372 | 11/1980 | Bernhard et al. | 156/109 |

FOREIGN PATENT DOCUMENTS

| | | | |
|---|---|---|---|
| 2845475 | 9/1979 | Fed. Rep. of Germany . | |
| 2834902 | 2/1980 | Fed. Rep. of Germany | 156/109 |

*Primary Examiner*—Willard E. Hoag

*Attorney, Agent, or Firm*—Karl F. Ross; Herbert Dubno

[57] ABSTRACT

A system for sealing the edges of assembled sandwiches of two sheets and a peripheral spacer has a first and a second conveyor extending parallel to each other through respective sides of a sealing station for displacing respective successions of the sandwiches therethrough. Respective first and second stops in the sides of the station position the sandwiches of the respective sides longitudinally and transversely therein. A transverse support extends across the two sides and is displaceable longitudinally in the station. A sealing device displaceable transversely along the support is engageable with the edges of the sandwiches in the sides of the stations for sealing same. This system is operated by displacing the device on the support and the support in the station to move the sealing device first around a sandwich in the one side of the station and then around the sandwich in the other side of the station. Meanwhile each sealed sandwich is replaced with a fresh unsealed sandwich while the device is in the other side of the station, that is while the sealing device is working in the first side of the station, the sandwich is being switched in the other side, and vice versa.

5 Claims, 3 Drawing Figures

METHOD AND SYSTEM FOR SEALING THE EDGES OF INSULATING-GLASS PANELS

FIELD OF THE INVENTION

The present invention relates to a method of and apparatus for sealing the edges of insulating-glass panels. More particularly this invention concerns the manufacture of so-called thermopane windows having two glass sheets separated by annular peripheral spacers to form an insulating dead-air space.

BACKGROUND OF THE INVENTION

It is essential that the space between the glass sheets of an insulating-glass panel of the type described above be perfectly sealed with respect to the exterior, so that dirt cannot enter this space and so that condensation cannot occur therein. This is typically done by first forming a sandwich of two perfectly clean and identical glass sheets flanking an annular spacer ring that lies somewhat inward of the aligned outer peripheries of these sheets, a procedure carried out in a controlled environment of low-humidity clean air. Then the outwardly open groove that runs around the edge of this sandwich between the sheets is filled with a viscous synthetic-resin mass that hardens, adhering to both sheets and to the spacer. Once hard this mass totally seals off the space between the sheets.

In a production-line operation this sealing of the edges is done by an automatic extruding device such as described in German patent documents 2,834,902 and 2,845,475 (see also U.S. Pat. Nos. 3,974,011 and 3,947,311. This device is a pendant head which is suspended above a conveyor that can move the workpieces past underneath it. The extruder head can rotate about a vertical axis. The conveyor is provided underneath this head, which is normally set up so it can move longitudinally in the travel direction and transversely thereto, with a short transverse conveyor, with clamping devices, and with some stops.

This apparatus carries out the following eight-step procedure to seal the edge of an assembled sandwich of two sheets and a peripheral spacer:

(A) The sandwich is fed longitudinally in the normal transport direction to the sealing location underneath the sealing device and the leading edge is positioned.

(B) The sandwich is then shifted transversely against a transverse stop so that its longitudinal edges are positioned transversely.

(C) The transverse stop is moved away from the sandwich which is clamped in place in the station.

(D) The sealing device is moved into position at the edge of the sandwich.

(E) The nozzle and position sensor of the sealing device are tilted to engage into the groove at the edge of the sandwich.

(F) The sealing device then travels transversely and longitudinally around the workpiece, changing direction at each corner, to seal all its edges.

(G) The nozzle is withdrawn from the workpiece.

(H) The sealed sandwich is released and moved longitudinally out of the sealing station.

Steps (D) through (G) utilize the mobile sealing device, but during steps (A) through (C) and (H), the so-called dead time of the system, this device is not used. This style of production therefore leaves a valuable piece of equipment idle for often about half the time. Such nonuse is not only inefficient in itself, but is particularly bad for a device that is extruding a hot synthetic resin, as during the dead time the resin can harden or cure in the nozzle.

OBJECTS OF THE INVENTION

It is therefore an object of the present invention to provide an improved method of and apparatus for sealing insulating-glass panel edges.

Another object is the provision of such a method of and apparatus for sealing thermopane edges which overcome the above-given disadvantages, that is which operates more efficiently and with less clogging than the prior-art systems.

SUMMARY OF THE INVENTION

A system for sealing the edges of assembled sandwiches of two sheets and a peripheral spacer according to the invention has a first and a second conveyor extending parallel to each other through respective sides or portions of a sealing station or location for displacing respective successions of the sandwiches therethrough. Respective first and second stops in the sides of the station position the sandwiches of the respective sides longitudinally and transversely therein. A transverse support extends across the two sides and is displaceable longitudinally in the station. A sealing device displaceable transversely along the support is engageable with the edges of the sandwiches in the sides of the stations for sealing same.

This system is operated by displacing the device on the support and the support in the staion to move the sealing device first around a sandwich in the one side of the station and then around the sandwich in the other side of the station. Meanwhile each sealed sandwich is replaced with a fresh unsealed sandwich while the device is in the other side of the station, that is while the sealing device is working in the first side of the station, the sandwich is being swtiched in the other side, and vice versa.

The station according to the invention has rigid struts interconnecting its sides. In addition the system is provided with longitudinally extending rails flanking the station. The support for the device is displaceable longitudinally on the rails.

DESCRIPTION OF THE DRAWING

The above and other features and advantages will become more readily apparent from the following, reference being made to the accompanying drawing in which.

SPECIFIC DESCRIPTION

Figure 1:
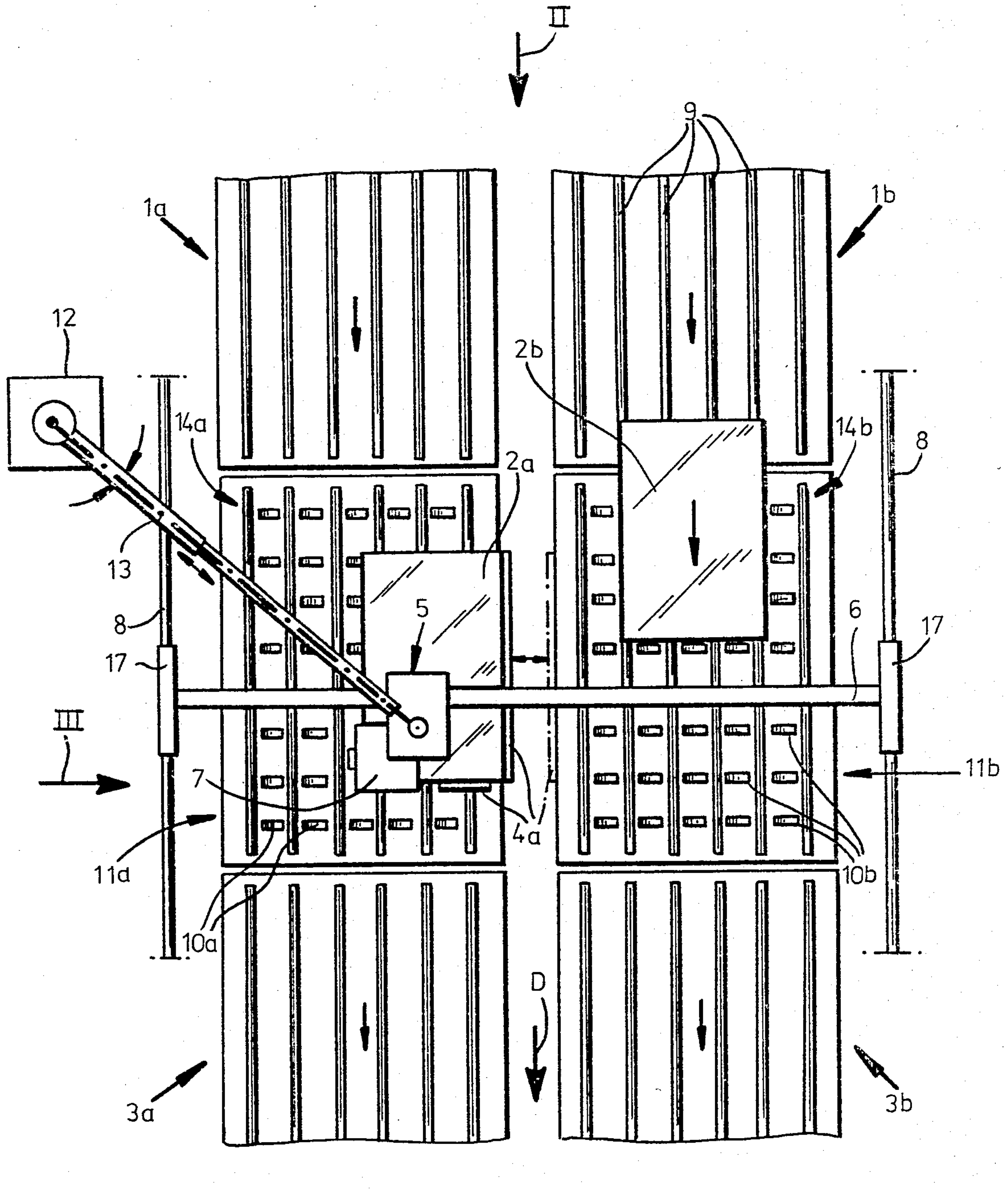
FIG. 1 is a top view of a system for carrying out the method of this invention.
Figure 2:
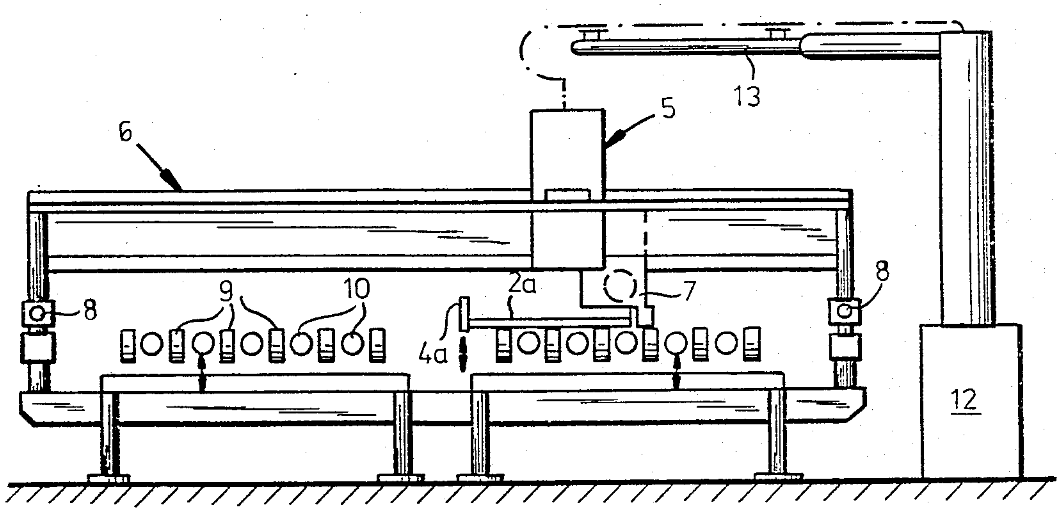
FIGS. 2 and 3 are end and side views respectively taken in the direction of arrows II and III of FIG. 1.
Figure 3:
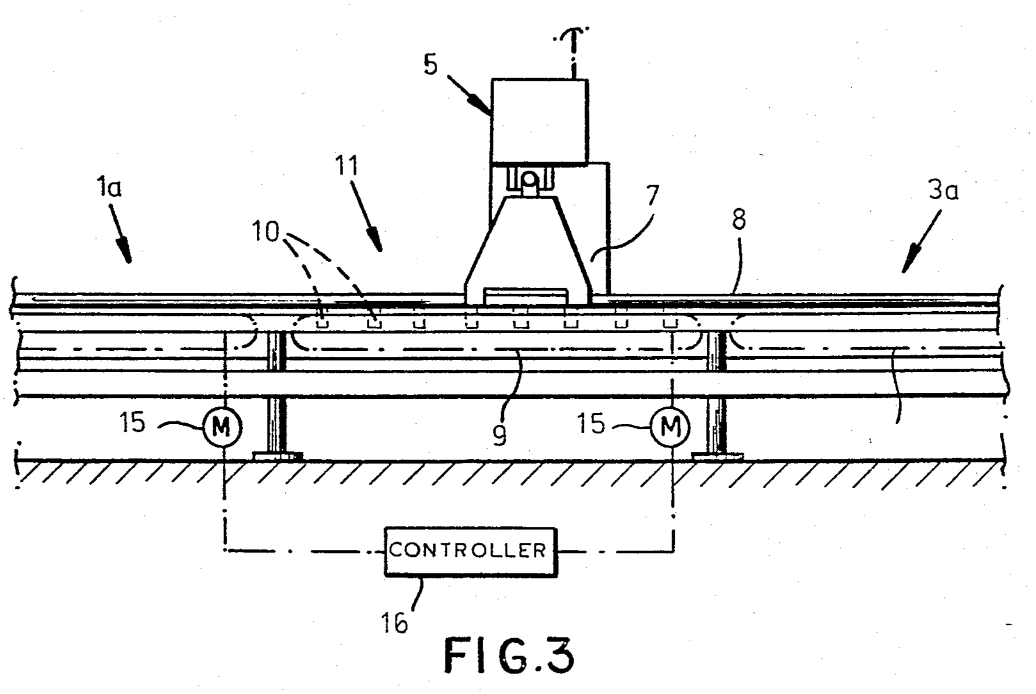

As seen in FIGS. 1 through 3 a pair of intake conveyors 1*a* and 1*b* extending parallel to each other in a transport direction D terminate at respective sides 11*a* and 11*b* of a sealing station 11*a*, 11*b* constituted as conveyors 14*a* and 14*b*. These are followed by respective output conveyors 3*a* and 3*b*. All of these conveyors 1*a*, 1*b*, 3*a*, 14*a*, and 14*b* are formed of longitudinally extending belts 9 powered by motors 15 independently operated by a controller 16.

In addition the station sides 11*a* and 11*b* are provided with respective transverse conveyors 10*a* and 10*b* constituted as a vertically shiftable sets of drivable rollers. Furthermore, each side 11*a* and 11*b* has a respective set of vertically displaceable transverse and longitudinal stops of which only the stops 4*a* of side 11*a* are shown in the drawing. These various conveyors and stops can displace and position respective successions of workpieces 2*a* and 2*b* as will be described below.

A transverse support 6 extending horizontally perpendicular to the direction D above the station 2*a*, 2*b* has ends 17 that ride on rails 8 that flank this station 2*a*, 2*b* and that extend horizontally in the travel direction D. Appropriate drives in the ends 17 operated by the controller 16 allow the longitudinal position of the support rail 6 to be established, normally in conjunction with standard position sensors for the respective workpieces 2*a* and 2*b*.

A sealing device 5 having its own drive operated by the controller 16 is transversely displaceable along the beam or support 6 and has a tilting and pivoting extrusion head 7 that can therefore be positioned to face in any direction in either station.

This system therefore functions as follows:

(a) The sandwich 2*a* is fed longitudinally in the normal transport direction D to the sealing station 11*a* and the leading edge is positioned, while in the other station 11*b* the sealing device 5 is working on another such sandwich 2*b*, sealing its edges.

(b) The sandwich 2*a* is then shifted transversely against transverse and longitudinal stops 4*a* so that its longitudinal edges are positioned transversely.

(c) The transverse stop 4*a* is moved away from the sandwich 2*a* which is clamped in place in the station, normally by a vacuum arrangement that holds it very solidly.

(d) Having in the meanwhile finished with the sandwich 2*b*, the sealing device 5 is moved into position at the edge of the sandwich 2*a*, and the finished sandwich 2*b* is moved out of the station 11*b* and replaced by an unsealed workpiece 2*b*.

(e) The nozzle 7 is tilted to engage into the groove at the edge of the sandwich 2*a*.

(f) The sealing nozzle 7 then travels transversely and longitudinally around the workpiece 2*a*, changing direction at each corner, to seal all its edges.

(g) The nozzle 7 is withdrawn from the workpiece 2*a* and moves back to station 11*b* to work on the new sandwich 2*b* which has meanwhile been accurately positioned in it.

(g) The sealed sandwich 2*a* is released and moved longitudinally out of the sealing station 11*a*.

Thereafter the cycle repeats. The sealing device 5 works almost continuously. In fact it is possible to tailor the conveyor speed to the speed at which the device 5 can seal an entire sandwich to achieve extremely high production rates, and in fact where the sealing device functions very rapidly it is possible to use more than two conveyors and sealing-station sides. Since this device 5 is in operation practically all of the time, the resin in it will not harden and clog it.

I claim:

1. A method for operating apparatus for sealing edges of assembled sandwiches of two sheets with a peripheral spacer therebetween, said apparatus comprising:

means including first and second conveyors extending longitudinally and horizontally parallel to each other, beneath sealing means, for displacing respective successions of sandwiches to said sealing means;

respective first and second means adjacent said conveyors for positioning the sandwiches longitudinally and transversely relative said conveyors;

said sealing means having a transverse support extending horizontally across both said conveyors and displaceable longitudinally of said conveyors; and a sealing device, including sensing means and an extrusion nozzle displaceable along said support and engageable with edges of the sandwiches on the conveyors for sealing said sandwiches, the method including the steps of:

moving two rows of said sandwiches along said first and second conveyors, positioning said sandwiches on said conveyors, with said means for positioning; and displacing said device along said support and said support along said conveyors to move the sealing device first around a sandwich on the first conveyor and then around a sandwich on the second conveyor;

said positoning including replacing each sealed sandwich with an unsealed sandwich, while the sealing device seals another of said sandwiches, with alternate and sequential operation of said conveyors.

2. An apparatus for sealing the edges of assembled sandwiches of two sheets with a peripheral spaces therebetween, the apparatus comprising:

means including a first and second conveyor laterally spaced and extending longitudinaly and horizontally parallel to each other adjacent sealing means for displacing respective successions of sandwiches therealong;

first and second means adjacent the conveyors for horizontally positioning the sandwiches longitudinally and transversely relative to the conveyors; a transverse support extending horizontally across the two conveyors and displaceable longitudinally relative to the conveyors;

and means including a sealing device tietable in all directions and displaceable along the support and movable along the edges of the sandwiches on the conveyors for sealing the sandwiches;

and control means for successively engaging position sensing means with each of two adjacent sandwiches on the two adjacent conveyors and for successively moving the sealing nozzle around each of the two adjacent sandwiches and sealing same.

3. The apparatus defined in claim 2, further comprising longitudinally extending rails flanking the location, the support for the device being displaceable longitudinally on the rails.

4. The apparatus defined in claim 2, further comprising respective first and second stops in the locations longitudinally and transversely engageable with the respective sandwiches therein.

5. In an apparatus for sealing the edges of assembled sandwiches of two sheets and a peripheral spacer, the apparatus comprising:

means including a conveyor extending longitudinally and horizontally, beneath a sealing means, for displacing a succession of the sandwiches horizontally and longitudinally therealong;

means adjacent the sealing means for horizontally positioning the sandwiches longitudinally and transversely on said conveyors; and means including a sealing device displaceable horizontally and transversely of the conveyors and engageable with the edges of the sandwiches on the conveyors for sealing said edges;

the improvement wherein:

two such conveyors extend longitudinally parallel to each other for displacing respective successions of the sandwiches therealong, respective such positioning means are provided adjacent the conveyors for positioning the sandwiches of the respective conveyors longitudinally and transversely thereon;

a transverse support extending across the two conveyors and being displaceable longitudinally of the conveyors; and the sealing device being displaceable horizontally and transversely along the support and being engageable with the edges of the respective sandwiches for sealing same and control means for alternately advancing said conveyors and sequentially sealing the sandwich on the first conveyor and then on the second conveyor.

* * * * *